US010154072B2

(12) United States Patent
Justice et al.

(10) Patent No.: US 10,154,072 B2
(45) Date of Patent: Dec. 11, 2018

(54) INTELLIGENT STREAMING OF MEDIA CONTENT

(71) Applicant: MICROSOFT CORPORATION LICENSING, LLC, Redmond, WA (US)

(72) Inventors: John Raymond Justice, Bellevue, WA (US); Euan Peter Garden, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/488,905

(22) Filed: Sep. 17, 2014

(65) Prior Publication Data

US 2016/0080442 A1   Mar. 17, 2016

(51) Int. Cl.
*H04L 29/06* (2006.01)
*H04L 29/08* (2006.01)
(Continued)

(52) U.S. Cl.
CPC .......... *H04L 65/4069* (2013.01); *A63F 13/30* (2014.09); *A63F 13/355* (2014.09);
(Continued)

(58) Field of Classification Search
CPC ........ A63F 13/30; A63F 13/355; A63F 13/60; A63F 13/77; A63F 13/12; A63F 13/358;
(Continued)

(56) References Cited

U.S. PATENT DOCUMENTS 5,802,292 A    9/1998  Mogul
6,587,113 B1*  7/2003  Baldwin ................... G06T 1/60
                                                         345/552
(Continued)

OTHER PUBLICATIONS

"International Search Report and Written Opinion Issued in PCT Application No. PCT/US2015/049879", dated Dec. 2, 2015, 10 Pages.
(Continued)

*Primary Examiner* — Greg C Bengzon
(74) *Attorney, Agent, or Firm* — Shook, Hardy & Bacon, L.L.P.

(57) ABSTRACT

In various embodiments, methods and systems for intelligent streaming of game content based on the level of interactivity of the game content are provided. The level of interactivity of game content is determined using techniques that classify the level of interactivity. The level of interactivity is defined for different components of game content. Streaming techniques are associated with game content having specific levels of interactivity. An edge computing infrastructure may facilitate intelligent streaming in that game assets classified as prefetch game assets or stream game assets are associated with prefetch instructions. The prefetch instructions are communicated from a game server to a game platform to instruct the game platform to prefetch a prefetch game asset to the edge computing infrastructure in advance of an anticipated game context in which the prefetch game asset is used. During the anticipated game context, the assets are retrieved for output at the game platform.

20 Claims, 9 Drawing Sheets

(51) Int. Cl.
*A63F 13/355* (2014.01)
*A63F 13/60* (2014.01)
*A63F 13/30* (2014.01)
*A63F 13/77* (2014.01)

(52) U.S. Cl.
CPC .............. *A63F 13/60* (2014.09); *A63F 13/77* (2014.09); *H04L 67/10* (2013.01); *H04L 67/2847* (2013.01)

(58) Field of Classification Search
CPC .......... A63F 13/50; A63F 13/52; A63F 13/55; A63F 13/56; A63F 13/69; A63F 13/79; A63F 13/80; A63F 2300/534; A63F 2300/538; A63F 2300/55; A63F 2300/64; A63F 2300/66; A63F 2300/6615; A63F 13/00; A63F 13/10; A63F 2300/201; A63F 2300/609; A63F 13/48; A63F 13/73; A63F 2300/407; A63F 2300/531; A63F 2300/535; A63F 2300/5546; A63F 2300/559; A63F 2300/636; A63F 9/24; H04L 65/4069; H04L 67/10; H04L 67/2847; H04L 65/4092; H04L 65/60; H04L 65/601; H04L 65/602; H04L 65/604; H04L 65/605; H04L 67/22; H04L 67/2819; H04L 67/2823; H04L 67/2828; H04L 67/2842; H04L 67/2852; H04L 67/2857; H04L 65/80; H04L 67/24; H04L 67/303; H04L 67/306; G06F 3/0484; G06T 15/005; G06T 17/20; G06T 1/20; G06T 2200/04; G06T 3/60; G06T 9/001; H04N 21/234318; H04N 21/472; H04N 21/47205; H04N 21/4781; H04N 7/17336; H04N 21/44213; H04N 21/44218; H04N 21/4223; H04N 21/637; H04N 21/6371; H04N 21/6373; H04N 21/6379; H04N 21/64769; H04N 21/6582; H04N 21/6587; H04N 21/2343; H04N 21/234336; H04N 21/234345; H04N 21/23439; H04N 21/251; H04N 21/258; H04N 21/252; H04N 21/2662; H04N 21/816; H04N 21/44209; H04N 21/44222; H04N 21/4424; H04N 21/458; H04N 21/4788; H04N 21/8549; H04H 60/46

See application file for complete search history.

(56) References Cited

U.S. PATENT DOCUMENTS

| | | | | |
|---|---|---|---|---|
| 6,744,438 B1* | 6/2004 | Baldwin | ................ | G06T 11/40 345/531 |
| 7,130,890 B1 | 10/2006 | Kumar et al. | | |
| 7,197,570 B2 | 3/2007 | Eylon et al. | | |
| 7,934,058 B2* | 4/2011 | Hawkins | ................ | A63F 13/00 711/137 |
| 8,892,684 B2* | 11/2014 | Plaisted | ................ | H04L 69/04 709/217 |
| 9,192,859 B2* | 11/2015 | Perlman | ................ | A63F 13/12 |
| 2007/0266170 A1* | 11/2007 | Mockett | ............ | H04N 21/4622 709/231 |
| 2009/0131177 A1* | 5/2009 | Pearce | ................ | A63F 13/10 463/43 |
| 2009/0262136 A1* | 10/2009 | Tischer | ................ | G06T 1/00 345/629 |
| 2009/0300144 A1 | 12/2009 | Marr et al. | | |
| 2009/0322784 A1* | 12/2009 | Sartori | ................ | H04N 21/426 345/619 |
| 2010/0166063 A1* | 7/2010 | Perlman | ................ | A63F 13/12 375/240.07 |
| 2010/0166065 A1* | 7/2010 | Perlman | ................ | A63F 13/12 375/240.07 |
| 2010/0167816 A1* | 7/2010 | Perlman | ................ | A63F 13/12 463/30 |
| 2011/0080519 A1* | 4/2011 | Chowdhry | ........... | H04N 19/115 348/453 |
| 2011/0107220 A1* | 5/2011 | Perlman | ................ | A63F 13/12 715/720 |
| 2011/0122063 A1* | 5/2011 | Perlman | ................ | H04N 5/4403 345/161 |
| 2011/0157197 A1* | 6/2011 | Clemie | ................ | G06T 9/00 345/522 |
| 2012/0004042 A1* | 1/2012 | Perry | ................ | A63F 13/12 463/42 |
| 2012/0017236 A1 | 1/2012 | Stafford et al. | | |
| 2012/0021835 A1* | 1/2012 | Keller | ................ | A63F 13/12 463/42 |
| 2012/0208636 A1* | 8/2012 | Feige | ................ | A63F 13/12 463/31 |
| 2012/0229445 A1* | 9/2012 | Jenkins | ................ | G06T 15/60 345/418 |
| 2012/0256915 A1* | 10/2012 | Jenkins | ................ | G06T 15/40 345/419 |
| 2012/0278439 A1* | 11/2012 | Ahiska | ................ | H04L 65/105 709/218 |
| 2012/0283017 A1 | 11/2012 | Ahiska et al. | | |
| 2012/0308192 A1* | 12/2012 | Chung | ............ | H04N 21/44218 386/230 |
| 2012/0309511 A1* | 12/2012 | Chung | ................ | H04N 21/274 463/30 |
| 2012/0309515 A1* | 12/2012 | Chung | ................ | H04N 21/274 463/31 |
| 2013/0005471 A1* | 1/2013 | Chung | ................ | A63F 13/12 463/42 |
| 2013/0016107 A1* | 1/2013 | Dharmapurikar | ....... | G06F 9/505 345/501 |
| 2013/0024545 A1* | 1/2013 | Sheppard | ................ | G06T 9/001 709/217 |
| 2013/0123004 A1* | 5/2013 | Kruglick | ................ | A63F 13/12 463/29 |
| 2013/0137518 A1* | 5/2013 | Lucas | ................ | A63F 13/12 463/42 |
| 2013/0147819 A1* | 6/2013 | Dharmapurikar | ......... | G06T 1/20 345/522 |
| 2013/0151651 A1* | 6/2013 | Chhaochharia | ....... | A63F 13/358 709/214 |
| 2013/0215115 A1* | 8/2013 | Jenkins | ................ | G06T 15/20 345/420 |
| 2013/0226837 A1 | 8/2013 | Lymberopoulos et al. | | |
| 2013/0244784 A1* | 9/2013 | Assa | ................ | G06F 3/0488 463/40 |
| 2013/0268621 A1* | 10/2013 | Mese | ................ | H04N 19/176 709/217 |
| 2013/0307847 A1* | 11/2013 | Dey | ................ | G06T 1/00 345/419 |
| 2013/0344960 A1* | 12/2013 | Perry | ................ | A63F 13/12 463/32 |
| 2014/0024447 A1* | 1/2014 | Le | ................ | A63F 13/12 463/31 |
| 2014/0082532 A1* | 3/2014 | Sheppard | ................ | A63F 13/10 715/762 |
| 2014/0136601 A1* | 5/2014 | Kent | ................ | H04L 65/605 709/203 |
| 2014/0136602 A1* | 5/2014 | Hitomi | ................ | H04L 67/10 709/203 |
| 2014/0195675 A1* | 7/2014 | Silver | ................ | H04L 65/1083 709/224 |
| 2014/0344469 A1* | 11/2014 | Nicholls | ................ | H04L 65/607 709/231 |
| 2014/0357379 A1* | 12/2014 | Kruglick | ................ | A63F 13/00 463/43 |

(56) References Cited

U.S. PATENT DOCUMENTS

2015/0049800 A1* 2/2015 Chen .................. H04N 19/103
                                              375/240.02
2016/0014437 A1* 1/2016 Perlman ................ A63F 13/12
                                              463/31
2017/0312624 A1* 11/2017 Perlman ................ A63F 13/12

OTHER PUBLICATIONS

Tzruya, et al., "Games@Large—a New Platform for Ubiquitous Gaming and Multimedia", In Broadband Europe, Dec. 11, 2006, 5 pages.

Prince, Matthew, "Introducing Page Rules: Advanced Caching (Including Configurable HTML Caching)", Published on: Feb. 22, 2012, Available at: http://blog.cloudflare.com/introducing-pagerules-advanced-caching.

"Second Written Opinion Issued in PCT Application No. PCT/US2015/049879", dated Jul. 20, 2016, 6 Pages.

"International Preliminary Report on Patentability Issued in PCT Application No. PCT/US2015/049879", dated Oct. 28, 2016, 6 Pages.

\* cited by examiner

INTELLIGENT STREAMING OF MEDIA CONTENT

BACKGROUND

Streaming media content generally refers to media content that is constantly received by and presented to an end-user while being provided by a content delivery network. Content delivery networks generally refer to large distributed system of servers deployed in multiple data centers across the internet to support media streaming of interactive and non-interactive media content. Interactive content includes video games that are executed on a game server and sent to a game platform (e.g., set top boxes, handheld devices, computing devices embedded in televisions, video game console). Non-interactive content includes video (e.g., movies and television shows) and audio (e.g., music). In practice, the content delivery network provider may get paid by content providers, such as media companies, for delivering their interactive and non-interactive media content to end users. The architecture and techniques that support streaming content may function differently for interactive and non-interactive media content. Non-interactive media content is not unique to a particular user, as such, media content may be streamed and hosted in data center servers (e.g., edge servers) such that the media content does not have to be directly sent from the content provider's network when requested by end users. For example, when a user makes a request for non-interactive content, the non-interactive content may exist on multiple edge servers local to the user and the user request is directed to an optimized server that has the content locally. As such, non-interactive content may have improved quality of service and less infrastructure costs.

In contrast, because of the individualized nature of interactive media content, content providers with interactive media content cannot take advantage of the edge servers as do content providers with non-interactive media. For example, a central gaming server has to render and execute game play and then receive interactive feedback from the user in a game streaming session unique to the user. As such, game streaming has to account for infrastructure costs, bandwidth requirements, and latency associated with providing streaming games. Conventional game design and game streaming methods and systems fail to provide ways to address the limitations of streaming interactive content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide for intelligent streaming of game content. Intelligent streaming of game content can include variations and combinations of streaming game content based on an identified interactivity level of the game content. The level of interactivity of game content can determined based on classifications of interactivity of game content using several different techniques such as, game-developer-based classification, play-testing-based classification, or machine-learning-based classification. The level of interactivity can be defined for different components of game content, such as, individual game contexts or particular game assets of game content. Streaming game content based at least in part on the level of interactivity of components of the game allows for using streaming techniques that are applied differently to the game content having specific levels of interactivity. In particular, game streaming constraints associated with highly interactive content may be mitigated based on identified low levels of interactivity for a game content context.

In one embodiment, game content identified as a predefined level of interactivity may be prefetched to improve game streaming. A content delivery network provider may facilitate streaming of prefetched content. In particular, video games may be designed based on classifying game assets as prefetch game assets or stream game assets such that a prefetch instruction is developed. The prefetch instruction, which is communicated from a game server to a game platform, instructs the game platform to prefetch a prefetch game asset to an edge computing infrastructure in advance of an anticipated game context in which the prefetch game asset is used. The prefetch game asset is prefetched from the game server to the edge computing infrastructure. Upon an occurrence of the anticipated game context, the prefetch game asset is downloaded from the edge computing infrastructure while the stream game asset is streamed from the game sever, both combined and provided for output at the game platform.

BRIEF DESCRIPTION OF THE DRAWINGS

The present invention is described in detail below with reference to the attached drawing figures, wherein.

DETAILED DESCRIPTION

Figure 1:
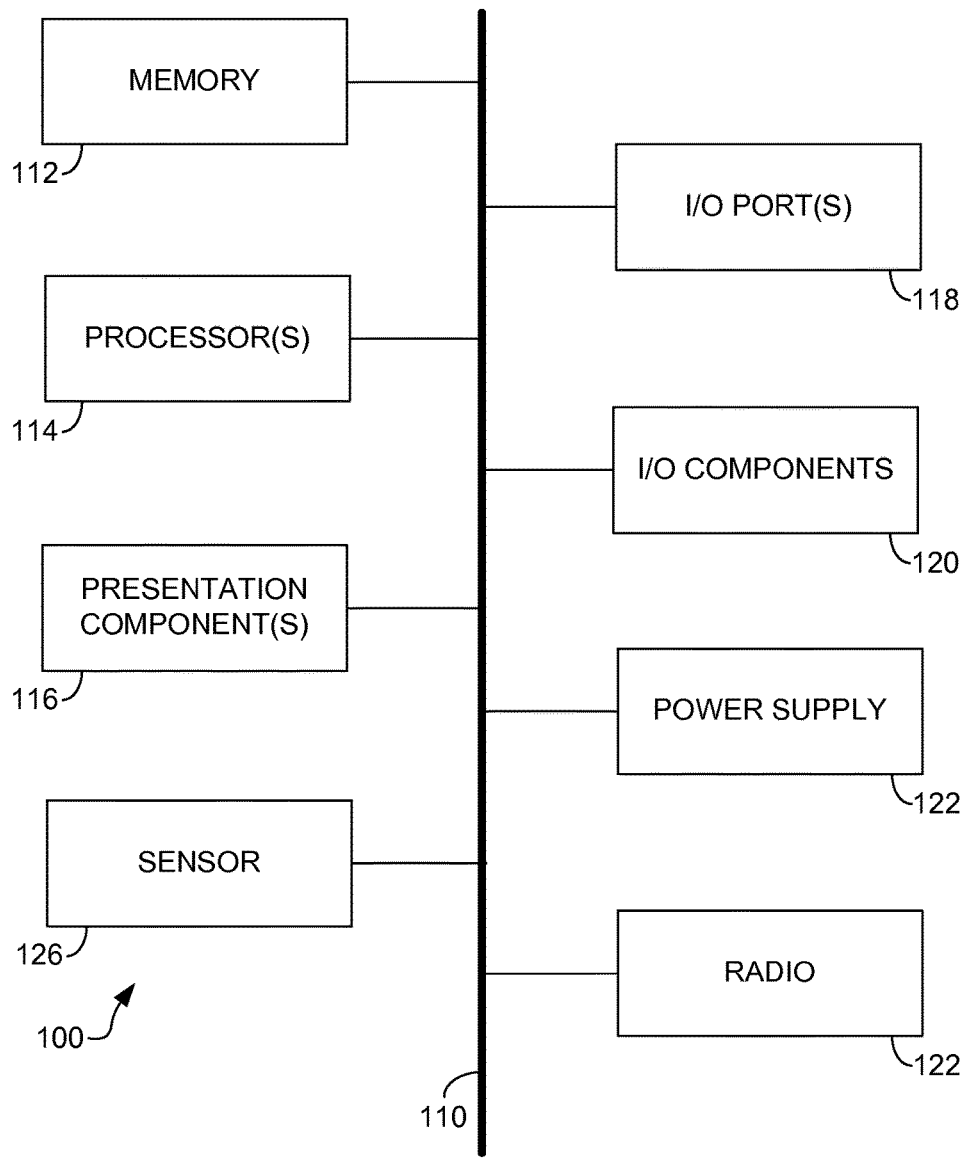
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Streaming media content generally refers to media content that is constantly received by and presented to an end-user while being provided by a content delivery network. Content delivery networks generally refer to large distributed system of servers deployed in multiple data centers across the internet to support media streaming. A content delivery network provider may facilitate streaming of interactive and non-interactive media content. Interactive content may include video games, in particular, video games that are rendered and executed on a game server and sent to a game platform (e.g., set top boxes, handheld devices, computing devices embedded in televisions, video game console). Non-interactive content may include video (e.g., movies and television shows) and audio (e.g., music). In practice, the content delivery network provider may get paid by content providers, such as media companies, for delivering their interactive and non-interactive media content to end users.

The architecture and techniques that support streaming content may function differently for interactive and non-interactive media content. Non-interactive media content is not unique to a particular user, as such, video encoding, buffer management and error correction techniques are applied differently non-interactive media compared to interactive media. In particular, non-interactive media content may be streamed and hosted in data center servers (e.g., edge servers) such that the media content does not have to be directly sent from the content provider's network when requested by end users. Edge servers provide edge computing that push applications, data, and computing power services away from centralized points to the logical extremes of a network. Edge servers facilitate reducing latency (delay caused by distance between a server and a user). Distance is important because the speed of the internet is limited by the speed of light as optic fiber cables are used to route traffic. Edger servers help shorten the distance between the user and the server. For example, when a user makes a request for non-interactive content, the non-interactive content may exist on multiple edge servers local to the user and the user request is directed to an optimized server that has the content locally. As such, non-interactive media content may have improved quality of service and less infrastructure costs.

In contrast, because of the individualized nature of interactive media content, servers with interactive media content cannot take advantage of video encoding, buffer management, error correction and the edge servers in the same manner as servers with non-interactive media. For example, a central gaming server has to render and execute gameplay and receive interactive feedback from the user in a game streaming session unique to the user. As such, game streaming has to account for additional infrastructure costs, bandwidth requirements, and latency associated with providing streaming games. Conventional game design and game streaming methods and systems fail to provide ways to address the limitations of streaming interactive content.

Embodiments of the present invention provide simple and efficient methods and systems for intelligent streaming of game content. At a high level, streaming of game content can include variations and combinations of streaming game content based on an identified interactivity level of the game content. The level of interactivity of game content can determined based on classifications of interactivity of game content using several different techniques such as, game-developer-based classification, play-testing-based classification, or machine-learning-based classification. The level of interactively can be defined for different components of game content, such as, individual game contexts or particular game assets of game content. Streaming game content based at least in part on the level of interactivity of components of the game allows for using streaming techniques that are applied differently to the game content having specific levels of interactivity. In particular game streaming constraints associated with highly interactive content may be mitigated based on identified low levels of interactivity for a game content context.

In one embodiment, game streaming may include prefetch instructions to intelligently prefetch game content (e.g., prefetch game assets) for a game platform such that the prefetched game content may optimize user game streaming sessions. Prefetching may generally refer to retrieving select game content in advance instead of streaming the game content directly from a game server. In particular, the selected game content may be processed (e.g., rendered images or prepared audio) on the game server and streamed in advance to a secondary storage (e.g., an edge computing infrastructure) such that the game content is processed and available prior to an anticipated game context.

By way of background, game streaming may comprise several different techniques that are contemplated with embodiments of the present invention. Basically, game streaming may function in a first technique such that game content is not stored on the user's hard drive and game code execution occurs primarily at a game server that does the execution operations. In the alternative, a second technique may be employed where some small portion of the game may be downloaded, for example in a cache, to start playing and the additional game content is downloaded to the user's device. A third alternative may involve a hybrid of all of, or portions of, the first technique and the second technique. Regardless of the type of game streaming, embodiments of the present invention may leverage prefetching of game content, especially in an edge computing infrastructure as described herein, to improve the game streaming experience.

Embodiments of the present invention may advantageously work with game platforms that support game streaming by, for example, allowing a user to play a game that is executed at a game server but downloaded and played at the game platform locally. In particular, the output of the game is executed on a game server and sent to the game platform (e.g., set top boxes, handheld devices, computing devices embedded in televisions, video game console). Some game platforms may not have hardware graphics support such that rendered graphics of the game content is streamed to the game platform. By way of example, most streaming games operate with a game server that processes the game content. As used herein, processing game content or processed game content may refer to rendered game images/graphics and/or prepared audio that is streamed to the game platform. The rendered game images and audio are synchronized with each other. In this regard, the game content is executed and processed on the game server.

The architecture of game streaming is such that several components on the game server and the game platform facilitate providing the user gaming session. For example, the server may include a render component that renders the images or graphics, a compression component that compresses special data like vertex buffers and textures, a network component that sends synchronized rendered images and audio to the game platform. In embodiments, the processed game content of rendered images and audio are encoded video and coded audio respectively. The rendered images and audio may then be streamed independently but synchronized based on a common timestamp.

The game platform includes several different components for processing the game content for output. For example, a receiving component may be configured for receiving and processing the rendered images and audio and then output them to the user. Additionally, the game platform may include several different control features (e.g., remotes or controllers) and interface features (e.g., display interface, gesture interface) that allow users to interact with the output processed game content. As such, an interactive component at the game platform may be configured for receiving user interactions and communicating the interactions to the game server such that they are processed to create new game content based on the user actions.

Embodiments of the present invention are directed to streaming game content based on an identified interactivity level of the game content. The level of interactivity of game content can determined based on classifications of interactivity of game content using several different techniques such as, game-developer-based classification, play-testing-based classification, or machine-learning-based classification. In particular, a game developer may include metadata or other designations of the level of interactivity of game contexts. A game developer may use APIs to identify the level of interactivity of game contexts including specific scenes or components of a particular game context. For example, the level of interactivity may be the interactivity level of particular game assets of a game context. The more interactive the game assets in a game context, the higher the classification of the level of interactivity, and the less interactive the game assets in a game context, the lower the classification of the level of interactivity. Individual games may further be associated with overall game interactivity classifications utilized in intelligent streaming.

The play-testing-based classification may include identifying, during game play, the specific interactivity of a game context and/or game assets. Play testing may include human-based evaluation. For example, a game tester may identify a first scene as having a high number of interactive assets and another scene as having low level of interactive assets. Based on the evaluation of the game content a runtime tool may be implemented to factor the identified level of interactivity of game content in processing the game for streaming.

Further, machine-learning-based classification can include learning from user interaction data with the game content what game contexts and/or game assets are interactive in identifying a level of interactivity for a game content. In particular, machine learning may be used to discover patterns in large sets of game play data to discover unknown properties relevant to interactive and non-interactive game components in determining the level of interactivity of game content. Additional computing tools may also facilitate identifying the interactivity level of game content. Computing tools may evaluate code to see what components require interaction input to continue game processing. Upon determining a level of interactivity for game content, including game contexts and game assets, game content can be streamed based at least in part on the level of interactivity of components.

Game streaming constraints associated with highly interactive content may be mitigated based on identified low levels of interactivity for a game content context. Game streaming constraints generally refer to limitations or restrictions on game streaming as a result of the interactive nature of the game content. For example, the video codecs or encoding techniques, buffer management, error correction, and edge infrastructure usage techniques are all game streaming constraints which can be mitigated as a function of the level of interactivity associated with a particular game context. Streaming constraints can be applied differently to game content having specific levels of interactivity. In embodiments, thresholds of the game streaming constraints may be set for particular designations of levels of interactivity. As such, even though a game is generally identified as interactive media content, identifying the specific level of interactivity of a game context allows varying game constraints to be applied to components of the game that have different levels of interactivity to improve the user gaming experience.

In one embodiment, an edge infrastructure can be used to facilitate prefetching game content. Prefetching game content comprises retrieving game content (e.g., prefetch game assets) from a primary storage associated with a game server where the game content may be executed and processed to a secondary storage (e.g., edge computing infrastructure) associated with a game platform. In particular, intelligently prefetching game content may refer to processing game content (i.e., rendering images and preparing audio) based on a plurality of game streaming session parameters such that the game content is retrieved from the primary storage and made available at a secondary storage in advance of an anticipated game context. Intelligent prefetching may occur simultaneously with active streaming of other processed game content during the game streaming session. Commonly, the primary storage associated with the game server is geographically distributed from the secondary storage. In this regard, the distance between the user and the prefetch game assets is reduced and available in advance. Having the prefetch game assets closer and in advance reduces latency and allows for additional processing certain prefetch game assets for an improved user experience.

By way of example, background music may be classified as a prefetch game asset, such that, upon a user interaction with the game that triggers an anticipated game context, the background music is prefetched from the primary storage at the game server to a secondary storage to support the anticipated game context. The background music may be downloaded while the user continues playing the game using processed game content that is received directly from the primary storage. The game play may continue up to the anticipated portion of the game where the background music is needed. At that time, the background music at the secondary storage is combined with the processed game content being streamed directly from the primary storage. It is contemplated that the background music may be intelligently prefetched based on a plurality of game streaming session parameters (e.g., bandwidth, memory buffer) that may be considerations in a decision to override or affirm a pre-programmed set of instructions to retrieve prefetch game assets.

Prefetching game content may be facilitated by game development. During a game design phase of game development, game content including assets, rules, design of gameplay, environment, storyline, and characters are defined. The game design phase may, with embodiments of the present invention, further include identifying game content that may be processed and prefetched at different portions during a game streaming session. In particular, game assets may be classified as prefetch game assets or stream game assets and associated with instructions for prefetching the prefetch game assets and providing the prefetch game assets for output or combining the prefetch game assets with stream game assets for output. For example, an audio prefetch game asset may be output with a video stream game asset, an audio stream game asset may be output with a video prefetch game asset, and a video prefetch game asset may be combined and output with a video stream game asset. Any other combinations and variations of the above are contemplated with embodiments of the present invention.

In addition, anticipated game contexts may be defined and used to trigger the retrieval of one or more prefetch game assets that are intelligently prefetched. An anticipated game context may trigger the prefetching of a prefetch game asset, such that, the prefetch game asset, alone or in combination with stream game assets, is provided for display upon the happening of the anticipated game context. The game design phase may creatively identify game assets that may be created as prefetch game assets and programmed with instructions to be prefetched in anticipation of a portion of the game that may utilize the prefetch game assets. Different types of instructions may define packages of prefetch game assets associated with anticipated game contexts and provide guidance to a game platform on how to incorporate the prefetch game assets into the game play. In embodiments, the programmed instructions may specifically provide thresholds for game session streaming parameters that may be used to override or affirm the particular instructions to retrieve prefetch game assets.

Several game streaming session parameters of a distributed network infrastructure supporting game streaming may be referenced before intelligently prefetching game content. Generally, a game streaming session parameter of the distributed network infrastructure may refer to a variable or constant component of the network infrastructure that impacts how and when prefetching game content. For example, game streaming session parameters may include bandwidth, buffer memory, user interactive actions, size of prefetch game assets, size of stream game assets, and edge computing infrastructure. In this regard, the value of the game streaming session parameter at a particular time may impact prefetching game content. By way of example, a prefetch game asset may be classified to be prefetched during an anticipated game context. Upon recognizing the anticipated game context, the game server may instruct the game platform to download a plurality of prefetch game assets.

With embodiments of the present invention, prefetching may further comprise the game platform configured to monitor bandwidth and determine that the bandwidth available on the network is up to a predefined threshold before initiating prefetching of the prefetch game asset. The predefined threshold may be defined in the instructions that direct the game platform to initiate prefetching game content. In particular, downloading the prefetch game asset may be overridden or affirmed based on a measure bandwidth of the game streaming session. In other words, the prefetch game asset may be prefetched when the bandwidth is up to the predefined threshold. In one scenario, the game platform may determine that the bandwidth is not sufficient to proceed with downloading prefetch game assets and directly stream the game assets from the server during the anticipated game context. In this regard, even though the game assets were classified as prefetch game assets the game assets are streamed directly from the game server. As such, the use of bandwidth is optimized for game streaming session based on the game streaming session parameter.

In another example, it may be possible to identify two users in a joint game session sharing the same edge computing infrastructure. Even though the game play may be unique to each user's interactions during a game streaming session, prefetched game content may be advantageously downloaded to the edge computing infrastructure to be shared between the users. For example, a video cut scene may be prefetched and stored in association with a pair of users in anticipation of a portion of game play because both users share the same edge computing infrastructure and are playing a collaborative type video game that would trigger the cut scene for both users at the same time. As such, the edge computing infrastructure may be utilized in interactive media content based on intelligent prefetching in a manner similar to non-interactive media content. Also additional processing may be available for prefetch game assets. A prefetch game asset may be identified rendered at a higher quality than it would have otherwise been rendered if the prefetch game asset was directly streamed from the game server. In this regard, the quality of the prefetch asset is improved because it is pre-processed and made available in advance of an anticipated context and then output at a better quality. Other variations and combinations of applications of novel features of the present invention are contemplated.

The prefetching of game content classified for prefetching provides for improved functionality for several different aspects of game streaming. For example, processed game content does not always have to be streamed directly from the game server; instead, select game content may be processed in advance, in anticipation of a game context, and intelligently prefetched during a game streaming session. Moreover, during a game design phase a game developer may creatively design games to support the functionality of embodiments of the present invention. For example, the identification of prefetch game assets and stream game assets during an anticipated game context, and the instructions on how to use these assets during game, fundamentally enhance game streaming. Further, maximization of resources may be afforded during a game streaming session, in that, based on the availability of a game streaming session parameter (e.g., bandwidth) prefetch game assets may be rendered with additional quality when the bandwidth is available or directly streamed when bandwidth is not available. Additionally, the computing resources of edge computing infrastructure may be leveraged to facilitate integrating intelligent prefetching in game streaming such that prefetch game assets, alone or in combination with stream game assets, are provided for output at runtime.

In a first aspect of the present invention, one or more computer storage media storing computer-useable instructions that, when used by one or more computing devices, causes the one or more computing devices to perform a method for prefetching game content is provided. The method includes receiving a prefetch instruction, from a game server in a distributed network infrastructure, to prefetch a prefetch game asset to an edge computing infrastructure. The prefetch game asset is classified as a prefetch game asset within a game streaming session. The method also includes prefetching the prefetch game asset. The prefetch game asset is processed at the game server in advance of an anticipated game context where the prefetch game asset is used. The method further includes providing, from the edge computing infrastructure, the prefetch game asset for output upon an occurrence of the anticipated game context.

In a second aspect of the present invention, one or more computer storage media storing computer-useable instructions that, when used by one or more computing devices, causes the one or more computing devices to perform a method for prefetching game content is provided. The method includes transmitting a prefetch instruction to a game platform in a distributed network infrastructure; the prefetch instruction instructs the game platform to prefetch a prefetch game asset to an edge computing infrastructure. The prefetch game asset is classified as a prefetch asset within a game streaming session. The method also includes receiving a prefetch request from the game platform, the prefetch request is generated based on referencing at least one game streaming session parameter. The method further includes processing the prefetch game asset. The method also includes transmitting the prefetch game asset to the edge computing infrastructure, the prefetch game asset is a processed game content that is stored at the edge computing infrastructure until an occurrence of an anticipated game context.

In a third aspect of the present invention, a computer-implemented method for prefetching game content is provided. The method includes identifying a game context for using a game asset in a game. The method also includes classifying the game asset as a prefetch game asset. The method further includes generating a prefetch instruction for the game asset, the prefetch instruction defines functioning of the game asset. The method includes embedding the prefetch instruction into game code for the game. The method also includes during execution of the game code, transmitting the prefetch instruction to a game platform, the prefetch instruction instructs the game platform to prefetch the game asset to an edge computing infrastructure. The method includes receiving a prefetch request from the game platform. The method includes processing the prefetch game asset. The method includes transmitting the prefetch game asset to the edge computing infrastructure.

In a fourth aspect of the present invention, a computer-implemented method for intelligently streaming game content is provided. The method includes identifying a game context for game content. The method further includes classifying at least a component of the game context with a level of interactivity. The level of interactivity of game context can determined based on classifications of interactivity of game content using several different techniques such as, game-developer-based classification, play-testing-based classification, or machine-learning-based classification. The method further includes streaming the game context based on the level of interactivity for the game context. Streaming game content based at least in part on the level of interactivity of components of the game allows for using streaming techniques that are applied differently to the game context having specific levels of interactivity.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits and/or receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Figure 2A:
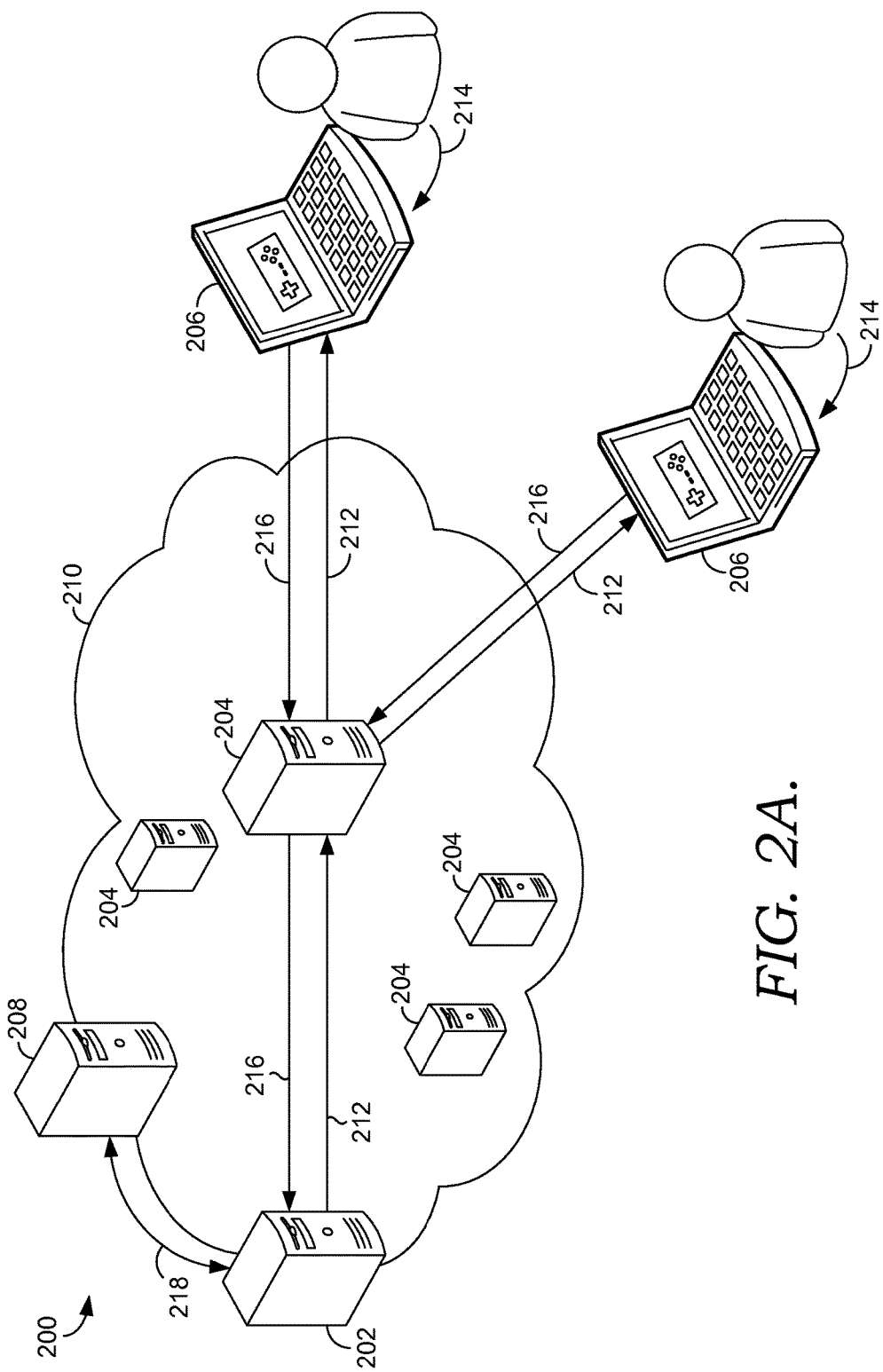
FIGS. 2A-B is a block diagram of an exemplary network environment in which embodiments of the invention may be employed.
Figure 2B:
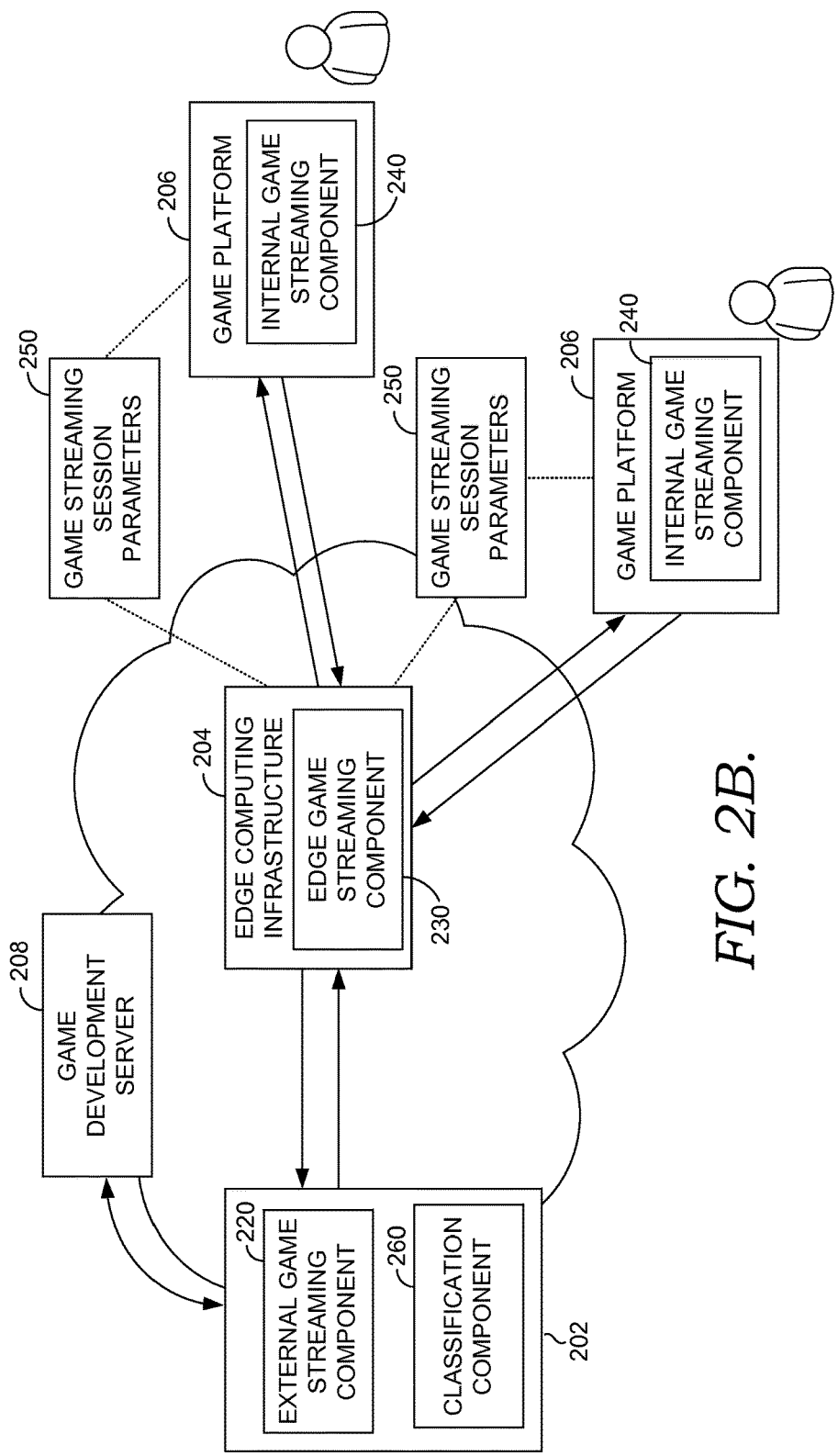

Turning now to FIGS. 2A-B, a game streaming infrastructure 200 (hereinafter "infrastructure") comprising multiple computing devices that can provide for prefetching game content is shown, in accordance with embodiments of the present invention. The infrastructure 200 shown in FIG. 2 is an example of one suitable infrastructure. The infrastructure 200 comprises multiple computing devices similar to the computing device 100 described with reference to FIG. 1. The infrastructure 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the network environment.

With reference to FIG. 2A, the infrastructure 200 may include a game server 202, an edge computing infrastructure 204, a game platform 206, and a game development sever 208, all in a networked environment 210. The network may include, without limitation, one or more local area networks (LANs) and/or wide area networks (WANs). Such networking environments are commonplace in offices, enterprise-wide computer networks, intranets and the Internet. Accordingly, the network is not further described herein.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Game server 202 is responsible for executing games for game streaming. Generally, the games are stored at the game server 202 and processed game content is streamed 212 directly to the game platform 206 via the edge computing infrastructure 204. Game execution may further be based on user actions 214 that are recorded at the game platform, for example, controls and button presses are recorded at the game platform and communicated 216 to the game server. Upon further processing based on the user actions 214, the game server may send additional processed game content. The above-described game streaming technique is merely exemplary and not intended to limit embodiments of the present inventions. It is contemplated that novel features of the present invention may be applied to other game streaming techniques.

With reference to FIG. 2B, the game server 202 may include an external game streaming component 220. The external game streaming component 220 may function with additional components (not shown) at the game server 202 to facilitate the execution of games for game streaming. The external game streaming component 220 is responsible for managing game streaming based on the level of interactivity of game content. In particular, different components of game content, such as, individual game contexts or particular game assets of game content may be associated with a level of interactivity. For example, a user may be in a pre-game context, in-game context, or post-game context. A pre-game context may be at a menu screen for selecting game options for the game streaming session, an in-game context may be a point during the game play, and a post-game context may refer to a cut scene at the end of a stage of the game. A game context may generally refer to the set of circumstances surrounding a game streaming session. Other variations and combinations of game contexts are contemplated with embodiments of the present invention.

Several different techniques (e.g., via a classification component 260) can be used to determine the level of interactivity of different game contexts and games assets such that the game contexts and game assets are streamed based on the level of interactivity. In one embodiment of streaming game content based on the level of interactivity, the external game streaming component 220 is configured to manage prefetch instructions for game assets at the game server. The external game streaming component 202 may further communicate prefetch instructions for game assets based on an anticipated game context. The status of the game context may define one or more anticipated game contexts which trigger the external game streaming component to communicate prefetch instructions.

A classification component 260 may be implemented to facilitate classifying the game content with different levels of interactivity. The location of the classification component is meant to be exemplary; it is contemplated that the classification component may be implemented independently or with the game development server 208 to achieve the functionality attributed therewith. The level of interactivity of game content can be determined based on several different techniques such as, game-developer-based classification, play-testing-based classification, or machine-learning-based classification. In particular, a game developer may include metadata or other designations of the level of interactivity of game contexts. A game developer may use APIs to identify the level of interactivity of game contexts including specific scenes or components (e.g., game assets) of a particular game context. The play-testing-based classification may include identifying during game play the interactivity of a game context and/or game assets. Play testing may include human-based evaluation and classification of the interactivity of game components in game content. Machine-learning-based classification can include learning from user interaction data with the game content what game contexts and/or game assets are interactive in identifying a level of interactivity for game content. Upon determining a level of interactivity for game content, including game contexts and game assets, game content can be streamed based at least in part on the level of interactivity of components.

The external game streaming component 220 may generate streaming instructions using streaming techniques that can be applied differently to the game content having specific levels of interactivity. As discussed, game streaming constraints associated with highly interactive content may be mitigated based on identified low levels of interactivity for a game content context. For example, the video codecs or encoding techniques, buffer management, error correction, and edge infrastructure usage techniques are all game streaming constraints which can be mitigated as a function of the level of interactivity associated with a particular game context. A streaming instruction to the game platform 206 may inform the game platform of a game context with a high interactivity designation such that a buffer management procedure associated with a high interactivity game context is used at the game platform. Additionally, when a low level of interactivity is determined for a game context, the external game streaming 220 may instead communicate a prefetch instruction to the game platform to either directly (i.e., to the game platform) or indirectly (i.e., to the edge computing infrastructure 204) prefetch the game context associated with a low level of interactivity.

In embodiments, thresholds of the game streaming constraints may be set for particular designations of levels of interactivity. For example, buffer management may be defined with a threshold buffer size based on the level of interactivity of the game context. Preprocessing time for non-interactive video content can also be configured with threshold times for preprocessing video content for transmission as a function of the level of interactivity associated with the video content. Other variations and combinations of instructions and streaming constraints based on the level of interactivity of a game context are contemplated with embodiments of the present invention.

Figure 3:
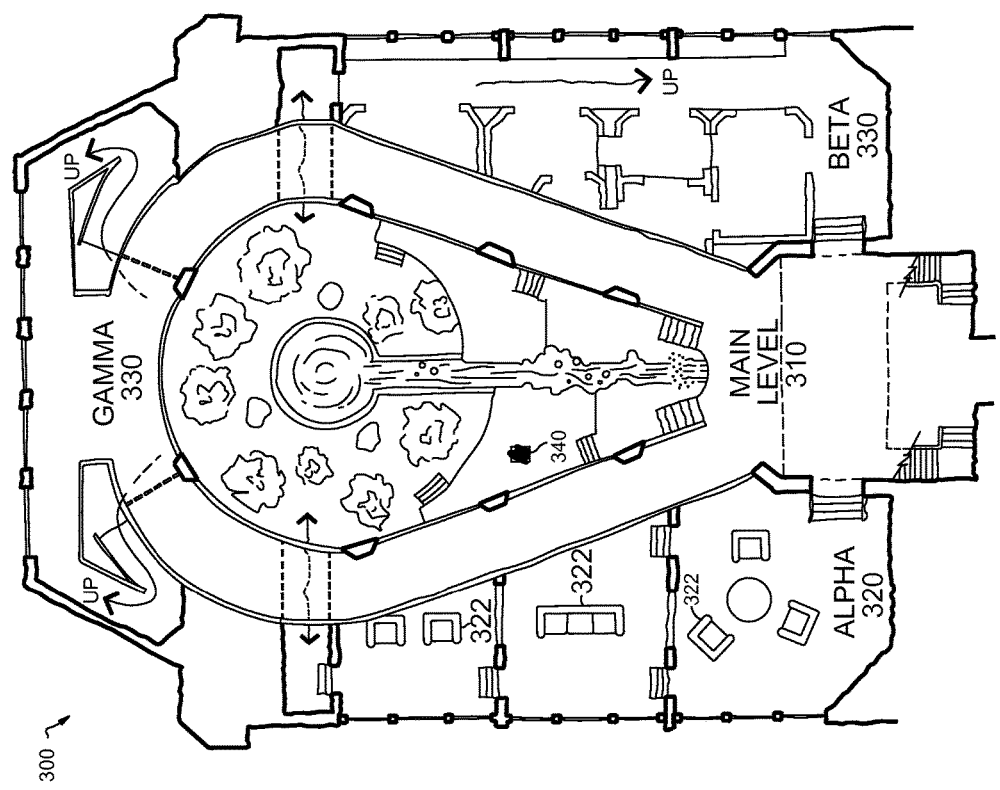
FIG. 3 is a schematic diagram showing a method for intelligent streaming of game content in accordance with embodiments of the present invention.
Figure 4:
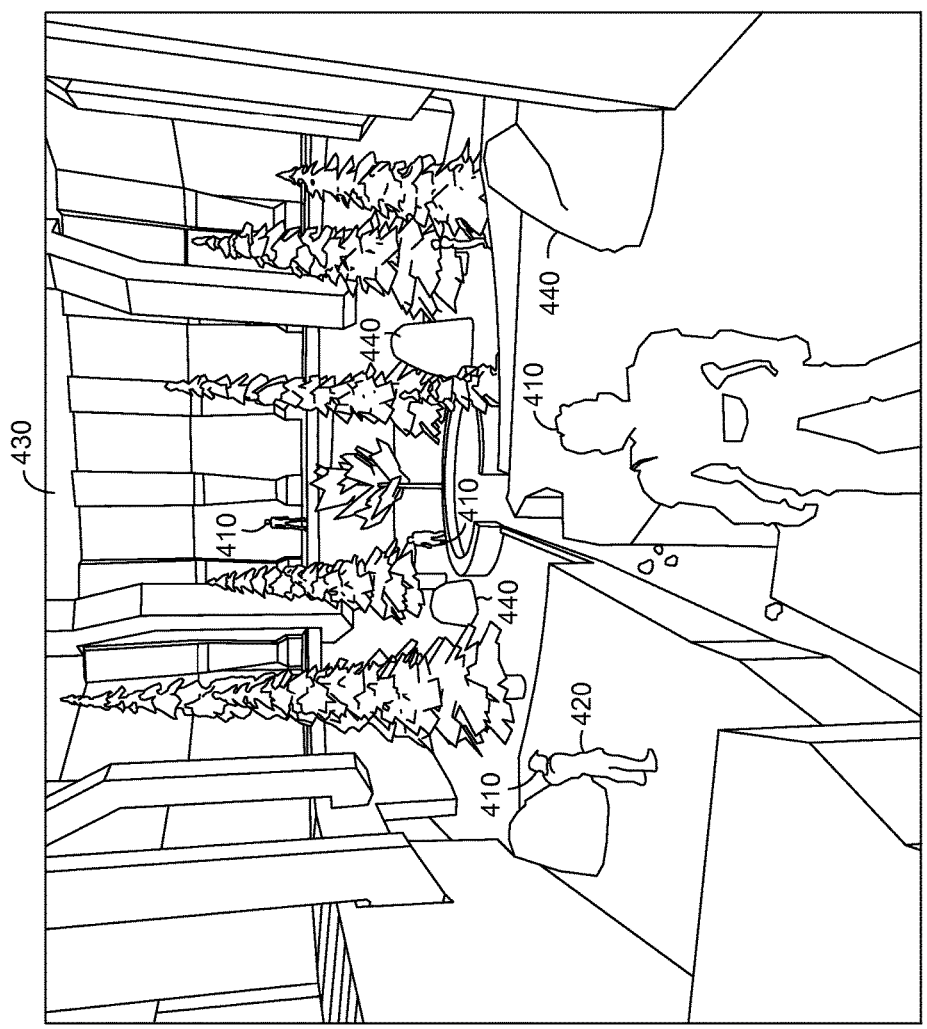
FIG. 4 is a schematic diagram showing a method for intelligent streaming of game content in accordance with embodiments of the present invention.

With reference to FIG. 3, an exemplary game context 300 schematic is shown. The game context 300 includes four contexts a main level 310, alpha 320, beta 330, and gamma 340. A game streaming session may have a current game context at the main level 310. Based on additional factors (e.g., user interactions or game programming) an anticipated context may be alpha 320. As such a prefetch instruction is triggered for prefetching prefetch game assets 322 associated with the alpha 320. In addition, an anticipated context may further be a cut scene 340 based on an interaction with another character during game play. In this regard, the cut scene may be prefetched as a prefetch game asset in advance of the game context, and upon happening of the game context the cut scene is downloaded from secondary storage at the edge computing infrastructure 204. The cut scene may also be afforded additional processing during the prefetch period such that the cut scene is rendered at a higher quality than if it had otherwise been streamed directly from the game server 202 during game play.

The game development server 208 is responsible for providing 218 the game code executed during game streaming. The game development server supports developing prefetch instructions and embedding the prefetch instructions into game code such that the prefetch instructions may be advantageously defined during game design. During a game design phase of game development, game content including assets, rules, design of gameplay, environment, storyline, and characters are defined. The game design phase may, with embodiments of the present invention, further include identifying game content that may be processed and prefetched at different portions during a game streaming session. In particular, game assets may be classified as prefetch game assets or stream game assets. With reference to FIG. 410, characters 410 may be defined as stream game assets, while FIG. 440 are classified as prefetch game assets. In addition, cut scene 420 and background 430 may also be classified as prefetch game assets, while additional elements of the game are streamed directly from the game server.

Prefetch game assets may be associated with prefetch instructions for prefetching the prefetch game assets. A developer may embed in game code instructions that direct the external game streaming component 220 on how to manage prefetch instructions at the game server 202. The instructions may define anticipated game context based on a status of the game context such that instructions are communicated to prefetch processed game content. For example, if a current game context is such that the user is within a defined number of actions to the end of a stage, an anticipated game context may be an end of stage cut scene. In this regard, the external game streaming component 220 may direct the game platform to download a prefetch game asset such that the processed game content is available in advance of the anticipated game context. A game developer may also define the usage of the prefetch game asset during the anticipated game context. The usage may specifically define how the prefetch game asset is used after it has been prefetched to the edge computing infrastructure. Usage may include prefetching and streaming timing, displaying game assets alone or in combination with other types of game assets, and synchronizing the prefetch game assets with other aspects of the game streaming session. For example, the usage definitions may support simultaneously processing the prefetch game asset with current game streaming session elements supporting the active game play.

The prefetch instructions may further include directions to the game platform 206 on how to output prefetch game assets. In particular, prefetch games assets may be combined with stream game assets for output. As such, there may be several different variations of outputting prefetch game assets that are captured in the prefetch instructions. For example, an audio prefetch game asset may be output with a video stream game asset, an audio stream game asset may be output with a video prefetch game asset, and a video prefetch game asset may be combined and output with a video stream game asset. Any other combinations and variations of the above are contemplated with embodiments of the present invention.

With continued reference to FIG. 2B, the prefetch instructions may additionally be configured to account for game streaming session parameters 250. Generally, a game streaming session parameter of the distributed network infrastructure may refer to a variable or constant component of the network infrastructure that impacts how and when prefetching game content. For example, game streaming session parameters 250 may include bandwidth, buffer memory, user interactive actions, size of prefetch game assets, size of stream game assets, and edge computing infrastructure. The prefetch instructions are configured with thresholds that may be evaluated to determine to override or affirm the prefetch instructions. Thresholds are defined based on the game streaming session parameter and the prefetch game asset for helping a game platform intelligently prefetch the prefetch game asset. In this regard, whether a prefetch game asset is prefetched may further be based on evaluating the game streaming session parameters 250.

Further, specialized prefetch game assets may be defined to improve other aspects of game play. A prefetch game asset may be defined as a corruption asset such that the corruption asset is used intelligently to repair corruption during game play. For example, low bandwidth may cause glitches or poor resolution in graphics. A corruption asset that has been prefetched may be triggered and output instead of low resolution graphics being streamed directly from the game server. It is contemplated that the corruption asset may be interwoven into the game context to seamlessly repair corruption caused by limitations in the game streaming session parameter (e.g., low bandwidth). Any other combinations and variations of the above are contemplated with embodiments of the present invention.

The edge computing infrastructure 204 is responsible for providing edge computing to the game streaming session. The edge computing infrastructure 204 provides game streaming processing that is away from the game server 202. In this regard, the game execution may still take place at the game server; however, at least portions of processed game content are transmitted based on prefetch instructions. In particular, the edge game streaming component 230 is configured to prefetch game assets and process stream game assets. At times, the prefetching of the prefetch game assets and the processing of stream game assets may be done simultaneously. The prefetch game assets are prefetched to support an anticipated game context and the stream game assets support a current game context. The prefetch game assets are prefetched based on prefetch instructions communicated between the game server 202 and the game platform 206. The prefetch game assets are then downloaded from the edge computing infrastructure 204 based on instructions from the game platform to provide the prefetch game assets from the secondary storage at the edge computing infrastructure.

The game platform 206 is responsible for processing game content during a game streaming session and providing the processed game content for output. The internal game streaming component 240 and additional components (not shown) may facilitate game streaming at the game platform. In particular, the internal game streaming component 240 is configured to process prefetch instructions for a variety of game contexts. The prefetch instructions may be received from the game server 202 having the external game streaming component 220. The prefetch instructions include information on how to prefetch game context for an anticipated game context. The anticipated game context may be based on a current game context of the game play. The internal game streaming component evaluates the game instructions and executes the prefetch instructions. Evaluating the prefetch instructions may include monitoring game session parameters. In embodiments, the internal game streaming component 240 may autonomously prescribe thresholds and/or the programmed instructions may specifically provide thresholds for game session streaming parameters that may be used to override or affirm the particular instructions to retrieve prefetch game assets. Intelligent prefetching comprises retrieving prefetch game assets while factoring game streaming session parameters. Intelligent prefetching may occur simultaneously with a game streaming session streaming other processed game content during the game streaming session. In this regard, the internal game streaming component 240 may evaluate the current available bandwidth before making a determination to prefetch a prefetch game asset. Upon a determination to prefetch the prefetch game asset, the prefetch game asset is prefetched to the edge computing infrastructure and streamed during an anticipated game context.

The internal game streaming component 240 is further responsible for outputting the processed game content. The processed game content may be different variations and combinations of stream game assets and prefetch assets. The prefetch instructions may include instructions on direct output and combination output of the prefetch game assets. For example, a portion of assets of the streaming game context may be prefetch game assets while another portion may be stream game assets. The prefetch game assets are downloaded from the edge computing infrastructure 204 while the stream game assets are directly streamed from the game server. User actions may be received and the cycle of game streaming processing continues based on the user actions.

Figure 5:
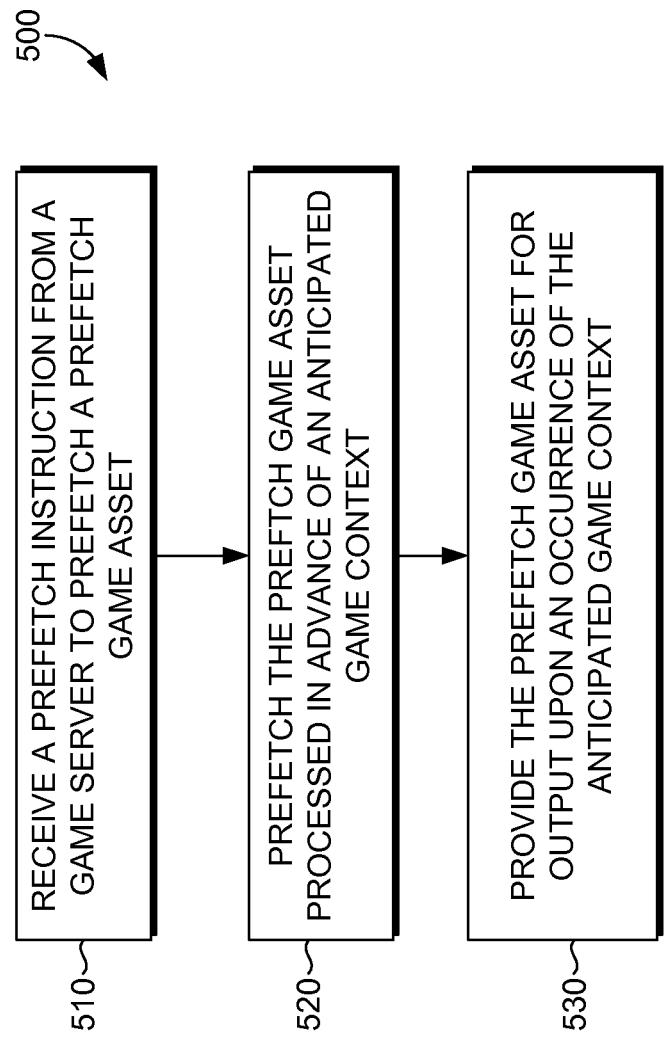
FIG. 5 is a flow diagram showing a method for intelligent streaming of game content in accordance with embodiments of the present invention.

Turning now to FIG. 5, a flow diagram is provided that illustrates a method 500 for prefetching game content. Initially at block 510, a prefetch instruction, to prefetch game content, is received from a game server in a distributed network infrastructure. The prefetch game asset is classified as a prefetch game asset within a game streaming session. The prefetch game asset may be classified as a prefetch game asset during a game development phase. Additional game assets may also be classified as stream game assets. At block 520, the prefetch game asset is prefetched. In particular, the prefetch game asset is prefetched from a primary storage associated with the game server and stored in a secondary storage associated with an edge computing infrastructure. The prefetch game asset is processed at the game sever in advance of an anticipated game context where the prefetch game asset is used. The anticipated game context may be one of a plurality of game contexts where each anticipated game context is a portion of game play that is triggered by interactions unique to the user during a game streaming session.

The prefetch game asset may be prefetched based on referencing interactive actions that trigger the anticipated context and determining to prefetch the game asset based on the interactive actions. In embodiments, the prefetch game asset may further be prefetched based on monitoring and referencing one or more game streaming session parameters of the distributed network infrastructure and determining to prefetch the prefetch game asset based on meeting a threshold of the one or more game streaming session parameters. It is contemplated that the prefetch instruction may be overridden when the threshold of the one or more game streaming session parameters is not met. At block 530, the prefetch game asset is provided for output upon occurrence of the anticipated game context. In particular, the prefetch game asset is downloaded from the secondary storage at the edge computing infrastructure and combined with a stream game asset from the primary storage. The stream game asset is directly executed and processed at the game server.

Figure 6:
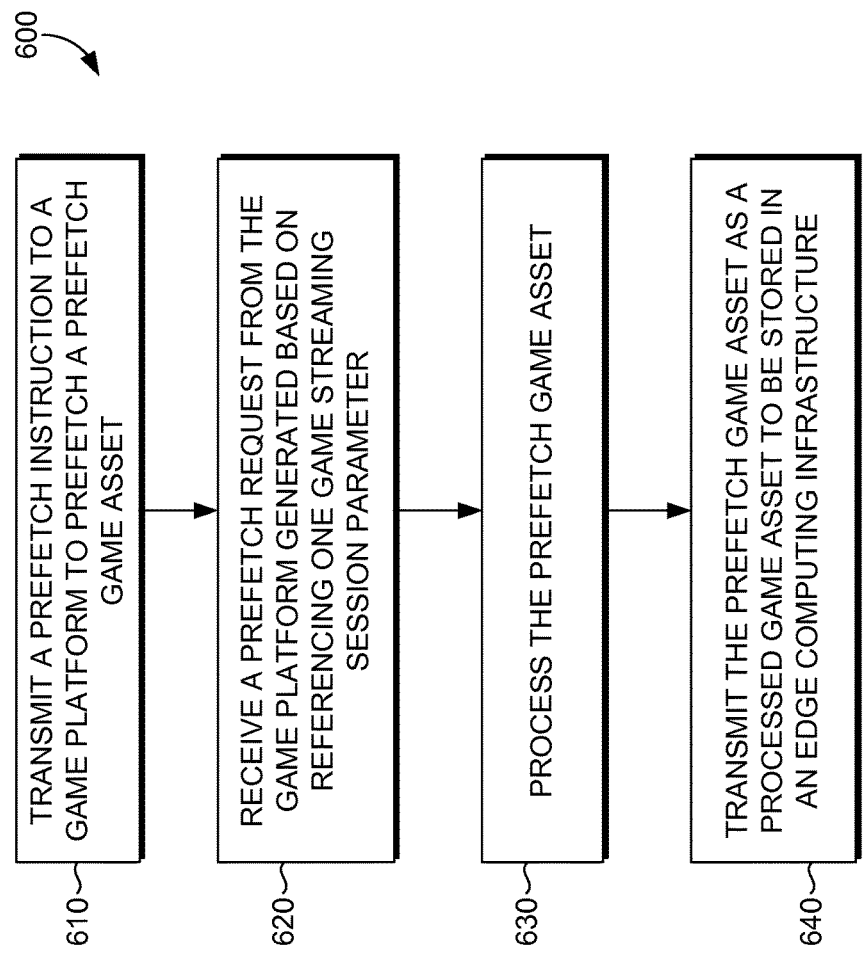
FIG. 6 is a flow diagram showing a method for intelligent streaming of game content in accordance with embodiments of the present invention.

Turning now to FIG. 6, a flow diagram is provided that illustrates a method 600 for prefetching game content. Initially at block 610, a prefetch instruction is transmitted to a game platform in a distributed network infrastructure. The prefetch instruction directs the game platform to prefetch a prefetch game asset. The prefetch game asset is classified as a prefetch asset within a game streaming session. The prefetch instruction may also be associated with a stream game asset classified as a prefetch asset within the game streaming session. At block 620, a prefetch request is received from the game platform. The prefetch request is generated at the game platform based on referencing at least one game session parameter. At block 630, the prefetch game asset is processed. Processing may include at least one of the following: rendering images, and preparing audio. In embodiments, the images are rendered into video and the audio is coded. At block 640, the prefetch game asset is transmitted. Transmitting the prefetch game asset comprises streaming the prefetch game asset from a primary storage to a secondary storage. The secondary storage is associated with an edge computing infrastructure such that the prefetch game asset is downloaded from the edge computing infrastructure upon occurrence of an anticipated game context.

Figure 7:
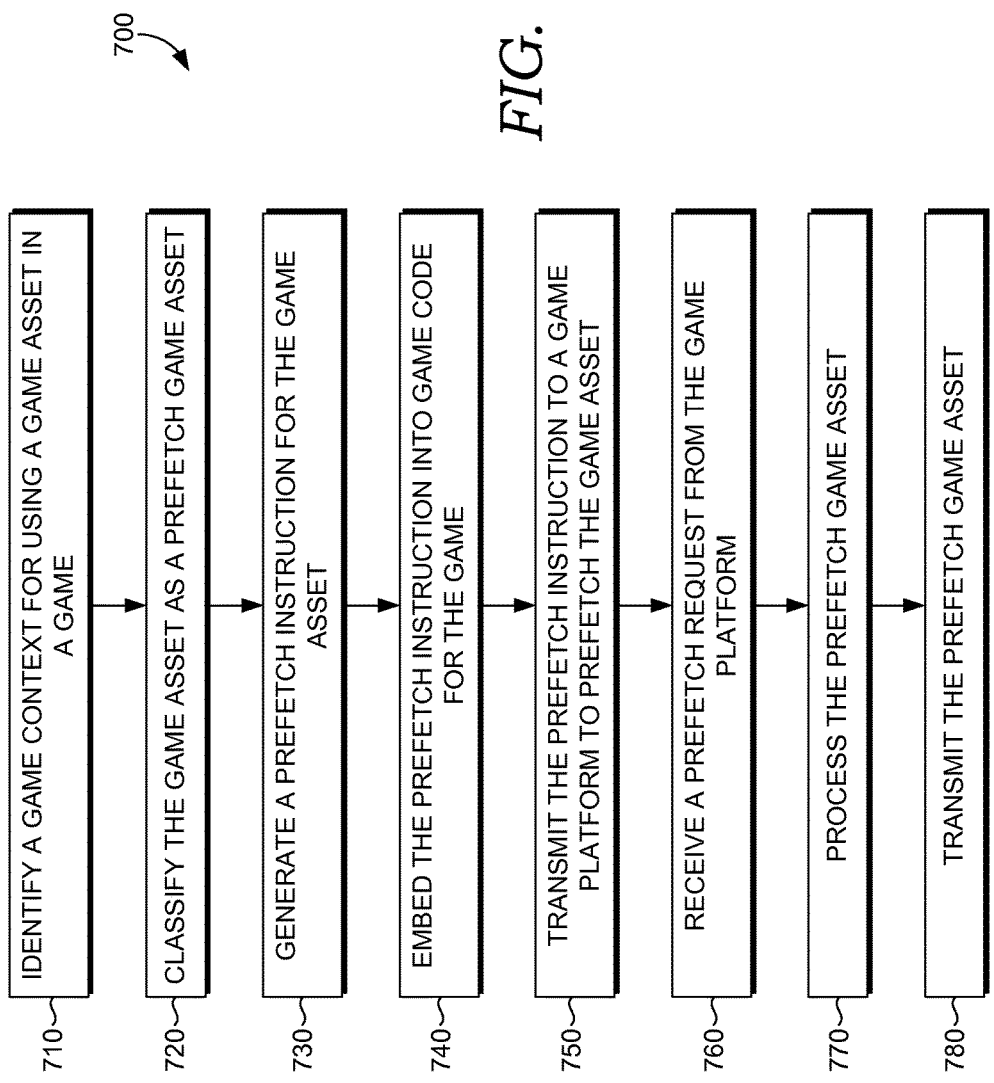
FIG. 7 is a flow diagram showing a method for intelligent streaming of game content in accordance with embodiments of the present invention.

Turning now to FIG. 7, a flow diagram is provided that illustrates a method 700 for prefetching game content. Initially at block 710, game context for using a game asset in a game is identified. The game context may be defined as an anticipated game context that is triggered based on one or more factors (e.g., current game context, user interaction). At block 720, the game asset is classified as a prefetch game asset. In embodiments, at least one additional component is classified as a stream game asset. At block 730, a prefetch instruction is generated for the game asset. The prefetch instruction defines the functioning of the game asset. Generating the prefetch instruction may additionally include classifying the game context as an anticipated game context in relation to another game context, and defining the usage of the game asset as a prefetch asset during the anticipated game context. In embodiments, game streaming session parameters are also identified and configured with thresholds in the prefetch instruction such that the thresholds are evaluated prior to sending a request for a prefetch game asset.

At block 740, the prefetch instruction is embedded into game code for the game. At block, 750, during execution of the game code, the prefetch instruction is transmitted to a game platform. The prefetch instruction instructs the game platform to prefetch the game asset. At block 760, in response to the prefetch instruction, a prefetch request is received from the game platform. At block 770, the prefetch game asset is processed. The game asset may be a rendered graphic and/or prepared audio. At block 780, the prefetch game asset is transmitted to an edge computing infrastructure. The edge computing infrastructure acts as a secondary storage for the prefetch game asset such that upon occurrence of an anticipated game context, the prefetch game asset is downloaded from the edge computing infrastructure. It is contemplated that transmitting the edge computing infrastructure may include simultaneously transmitting the prefetch game asset for the anticipated game context and a stream game asset for a current game context.

Figure 8:
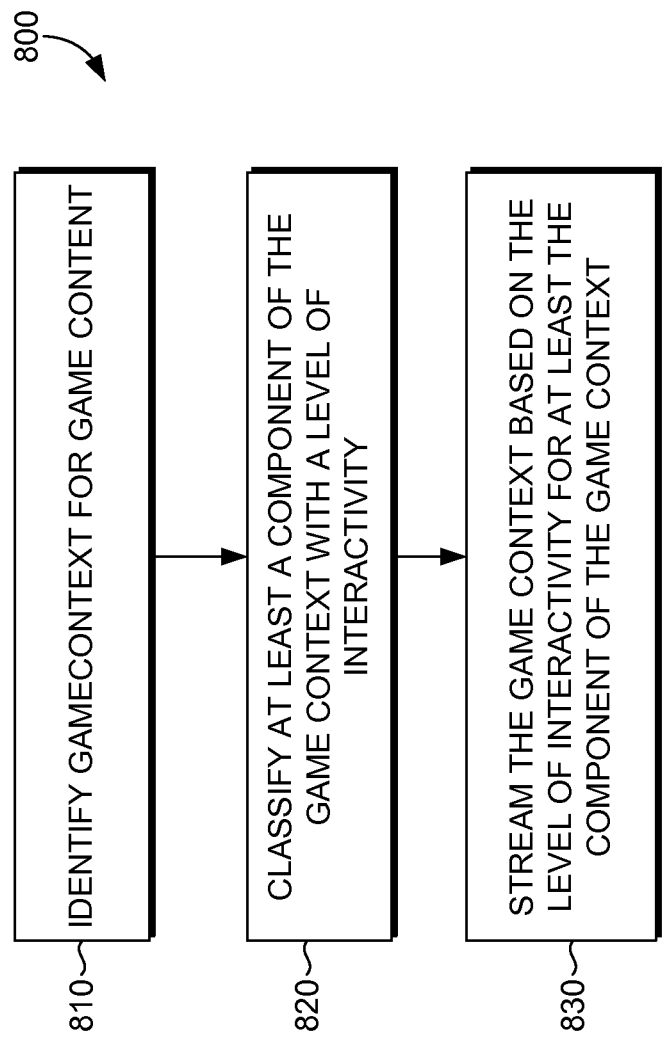
FIG. 8 is a flow diagram showing a method for prefetching game content in accordance with embodiments of the present invention.

Turning now to FIG. 8, a flow diagram is provided that illustrates a method 800 for prefetching game content. Initially at block 810, a game context for game content is identified. At block 820, at least a component of the game context is classified with a level of interactivity. Classifying the game context can be based on game-developer-based classification, a play-testing-based classification, or a machine-learning-based classification. At block 830, the game context is streamed based on at least the level of interactivity for the component of the game context. It is contemplated that streaming the game context based on the level of interactivity of the game context further comprises identifying one or more game streaming constraints; and configuring thresholds of the one or more game streaming constraints, where the thresholds are based on the level of interactivity of the game context.

In embodiments prefetch instructions can be defined such that, a first game component having a first level of interactivity may be prefetched to an edge computing infrastructure. Upon identifying an anticipated game context, the first game component can be streamed from the edge computing infrastructure while a second game component is simultaneously streamed from a game server. The second game component having a second level of interactivity. The edge computing infrastructure acts as a secondary storage for a game context associated with no interactivity such that upon occurrence of an anticipated game context, the game context component is downloaded from the edge computing infrastructure.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when executed by one or more processors, causes the one or more processors to perform a method for prefetching game content, the method comprising:

receiving a prefetch instruction, from a game server in a distributed network infrastructure, to prefetch a prefetch game asset to an edge computing infrastructure, wherein the prefetch game asset is classified as a prefetch game asset within a game streaming session, the prefetch game asset is a portion of game content having a predefined level of interactivity relative to other portions of game content of the game streaming session, such that, the prefetch game asset portion of game content is selected to be prefetched based on the predefined level of interactivity, wherein a threshold of game streaming constraints applied to the prefetch game asset of the game content is based on the predefined level of interactivity of the prefetch game asset, wherein game streaming constraints indicate restrictions applied to streaming of game content;

prefetching the prefetch game asset, wherein the prefetch game asset is processed at the game server in advance of an anticipated game context where the prefetch game asset is used; and providing, from the edge computing infrastructure, the prefetch game asset for output upon an occurrence of the anticipated game context.

2. The media of claim 1, wherein the prefetch game asset is classified as a prefetch asset during a game development phase.

3. The media of claim 2, wherein the prefetch instruction identifies a plurality of prefetch game assets as a package in association with the anticipated game context, the instructions are defined during the game development phase.

4. The media of claim 1, wherein the anticipated game context is one of a plurality of anticipated game contexts, wherein the anticipated game context is a portion of game play that is triggered by interactions that are unique to a user during a game streaming session.

5. The media of claim 1, wherein the prefetch game asset is a correction asset that repairs game corruption.

6. The media of claim 1, wherein prefetching the prefetch game asset is based on:
referencing one or more interactive actions that trigger the anticipated game context; and
determining to prefetch the prefetch game asset based on the one or more interactive actions.

7. The media of claim 1, wherein prefetching the prefetch game asset is based on referencing one or more game streaming session parameters of the distributed network infrastructure; and
determining to prefetch the prefetch game asset based on meeting a threshold of the one or more game streaming session parameters.

8. The media of claim 1, wherein prefetching the prefetch game asset is based on:
prefetching the prefetch game asset from a primary storage associated with the game server; and
storing the prefetch game asset on a secondary storage associated with the edge computing infrastructure.

9. The media of claim 8, wherein providing the prefetch game asset for output is based on:
downloading the prefetch game asset from the secondary storage; and
combining the prefetch game asset from the secondary storage with the stream game asset from the primary storage, wherein the stream game content is directly executed and processed at the game server.

10. One or more computer storage media storing computer-useable instructions that, when executed by one or more processors, causes the one or more processors to perform a method for prefetching game content, the method comprising:

transmitting a prefetch instruction to a game platform in a distributed network infrastructure, the prefetch instruction instructs the game platform to prefetch a prefetch game asset to an edge computing infrastructure, wherein the prefetch game asset is classified as a prefetch asset within a game streaming session, the prefetch game asset is a portion of game content having a predefined level of interactivity relative to other portions of game content of the game streaming session, such that, the prefetch game asset portion of game content is selected to be prefetched based on the predefined level of interactivity, wherein a threshold of game streaming constraints applied to the prefetch game asset of the game content is based on the predefined level of interactivity of the prefetch game asset, wherein game streaming constraints indicate restrictions applied to streaming of game content;

receiving a prefetch request from the game platform, wherein the prefetch request is generated based on referencing at least one game streaming session parameter;

processing the prefetch game asset; and transmitting the prefetch game asset to the edge computing infrastructure, wherein the prefetch game asset is a processed game content that is stored at the edge computing infrastructure until an occurrence of an anticipated game context.

11. The media of claim 10, wherein the prefetch instruction is further associated with a stream game asset, wherein the stream game asset is classified as a stream game asset within the game streaming session.

12. The media of claim 10, wherein transmitting the prefetch instruction is based on:
referencing a current game context based on the prefetch instruction, the prefetch instruction embedded in game code; and
identifying one or more anticipated game contexts based on the current game context, wherein the anticipated game context is associated with the prefetch game asset.

13. The media of claim 10, wherein processing the prefetch game asset comprising at least of one of the following:
rendering images; and
preparing audio.

14. The media of claim 10, wherein the transmitting the prefetch game asset comprises streaming the prefetch game asset from a primary storage to a secondary storage, wherein the secondary storage is associated with the edge computing infrastructure such that the prefetch game asset is downloaded from the edge computing infrastructure upon occurrence of the anticipated game context.

15. The media of claim 14, wherein streaming the prefetch game asset occurs simultaneously with streaming of at least stream game assets associated with a current game context.

16. A computer-implemented method for intelligently streaming game content, the method comprising:
identifying a game context for game content;
classifying at least a component of the game context with a level of interactivity, the component of the game context is game content having the level of interactivity relative to other components of the game context, such that, the component of the game content is selected to be prefetched with based on the level of interactivity, wherein a threshold of game streaming constraints applied to the prefetch game asset of the game content is based on the predefined level of interactivity of the prefetch game asset, wherein game streaming constraints indicate restrictions applied to streaming of game content;

streaming the game context based on at least the level of interactivity for the component of the game context.

17. The method of claim 16, wherein classifying the game context is based on at least one of: a game-developer-based classification, a play-testing-based classification, or a machine-learning-based classification.

18. The method of claim 16, wherein streaming the game context based on the level of interactivity of the game context further comprises:

identifying one or more game streaming constraints, wherein the one or more game streaming constraints includes at least video codecs or encoding techniques, buffer management, error correction, or edge infrastructure usage techniques; and configuring thresholds of the one or more game streaming constraints, wherein the thresholds are based on the level of interactivity of the game context.

19. The method of claim 16 further comprising:

simultaneously steaming a first game component having a first level of interactivity from an edge computing infrastructure and streaming a second game component having a second level of interactivity from a game server.

20. The method of claim 19, wherein the edge computing infrastructure acts as a secondary storage for a game context component associated with no interactivity such that upon occurrence of an anticipated game context, the game context component is downloaded from the edge computing infrastructure.

* * * * *